Sept. 13, 1955 H. A. DVORAK 2,717,952
TEMPERATURE-CONTROLLED ELECTRICAL SOLDERING IRON
Filed April 5, 1952 3 Sheets-Sheet 3
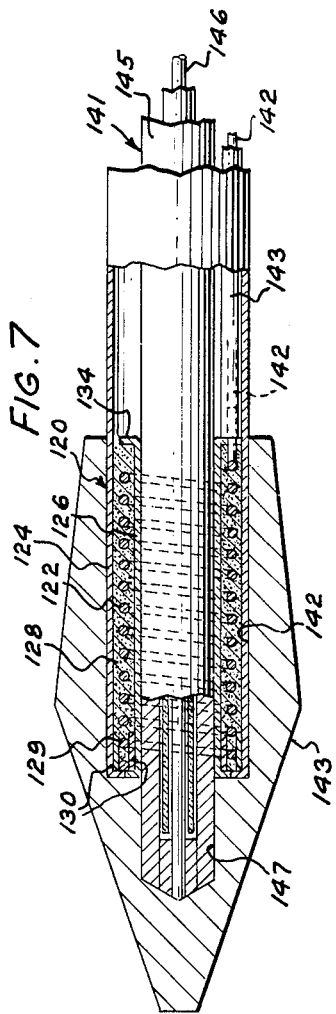
INVENTOR
H. A. DVORAK
BY E. F. Kane
ATTORNEY United States Patent Office 2,717,952
Patented Sept. 13, 1955

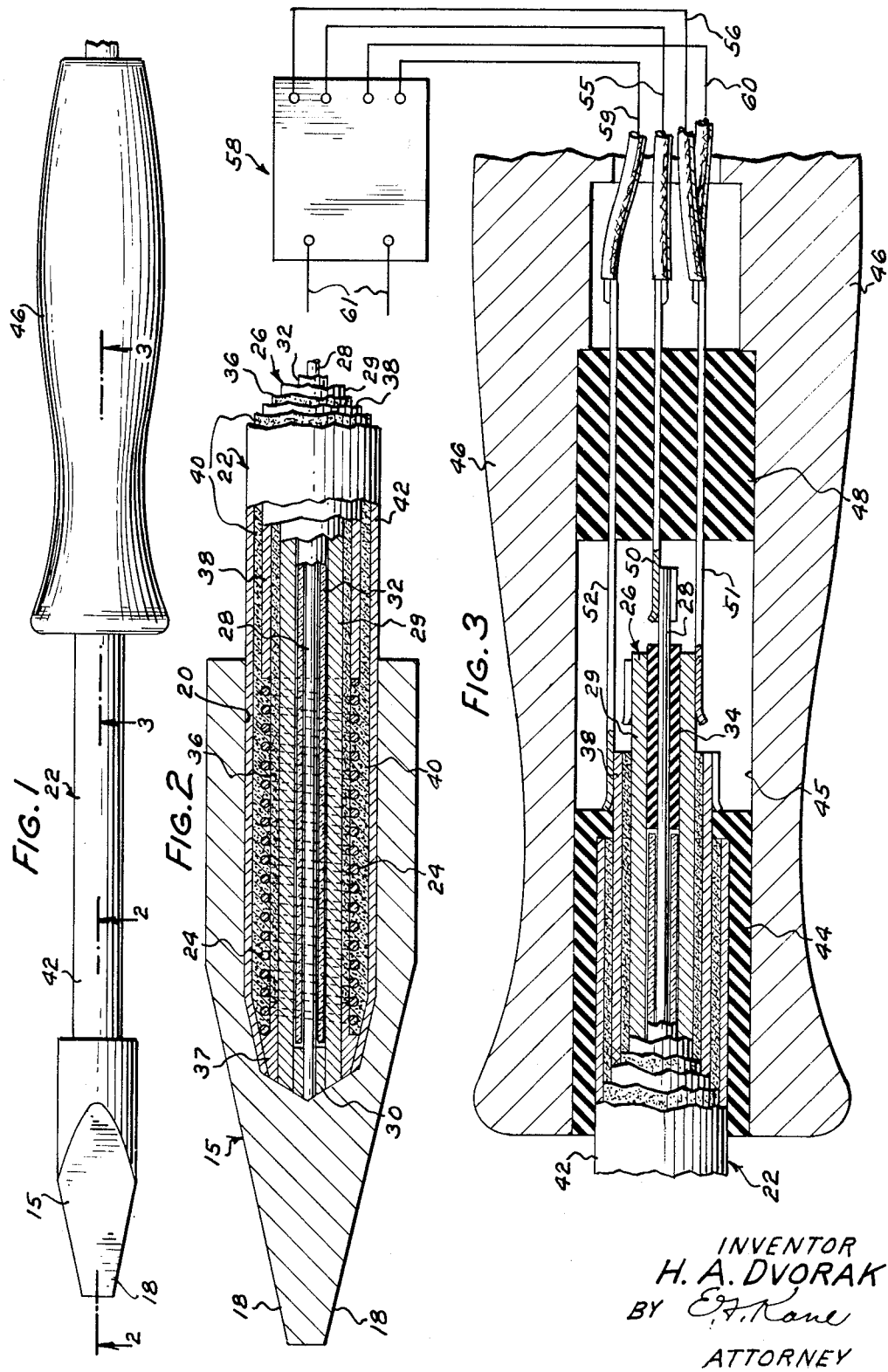

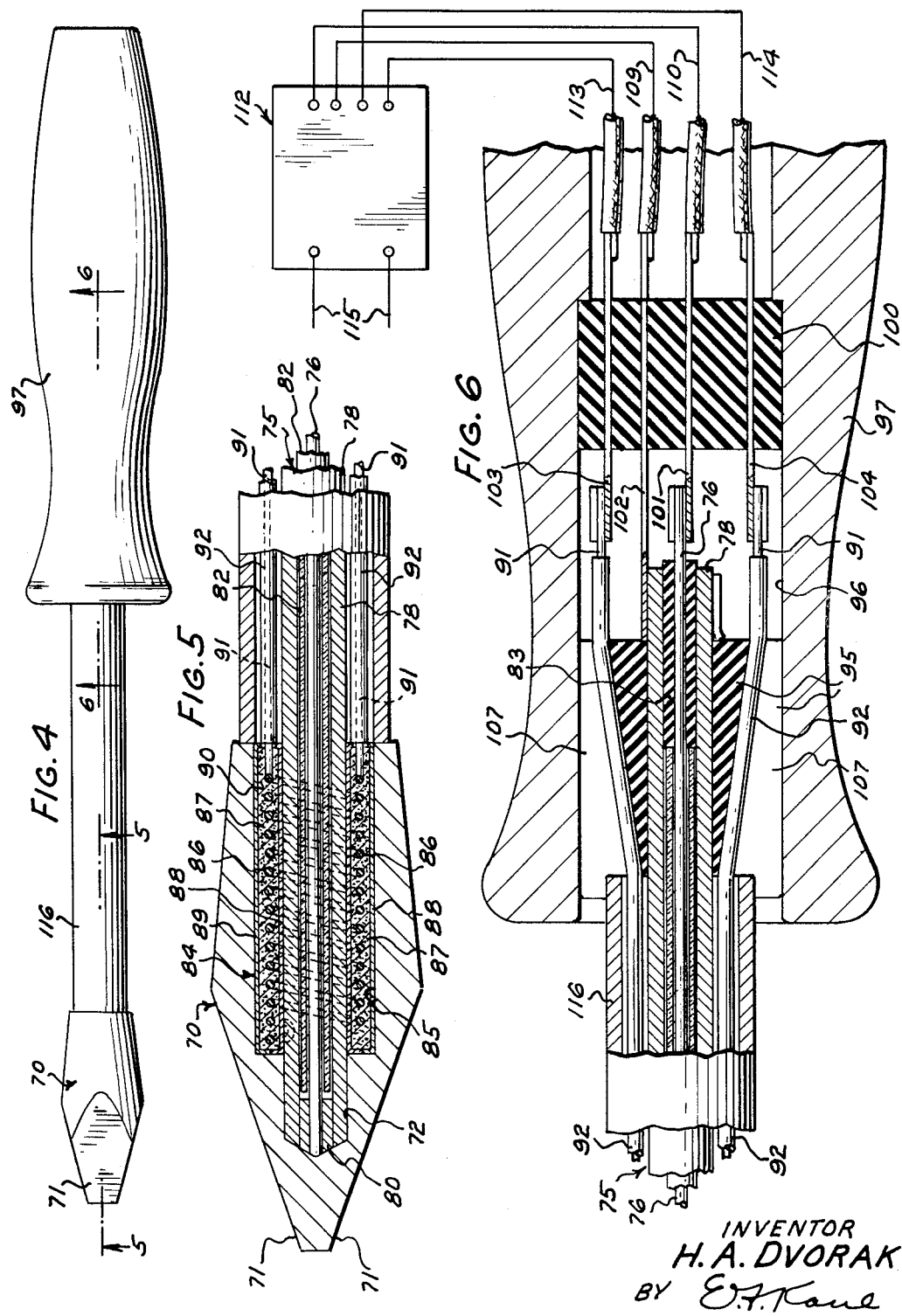

2,717,952

TEMPERATURE-CONTROLLED ELECTRICAL SOLDERING IRON

Howard A. Dvorak, Brookfield, Ill., assignor to Western Electric Company, Incorporated, New York, N. Y., a corporation of New York Application April 5, 1952, Serial No. 280,785

16 Claims. (Cl. 219—26)

This invention relates to electrical soldering irons and more particularly to an electrical soldering iron having a thermocouple therein adapted to be connected to a remote control unit for controlling the power supplied to the soldering iron to maintain a substantially uniform temperature in the tip of the iron.

In previous efforts to provide a satisfactory lightweight soldering iron with a highly accurate and sensitive control of the temperature of the working surface of the iron, it has been proposed to mount a thermocouple in the tip of the iron and to encircle one of the leads to the hot junction of the thermocouple with a heating unit. In irons of that type considerable difficulty has been experienced in manufacturing units which are easy to repair and operate for a satisfactory length of time.

It is an object of the present invention to provide a rugged and efficient electrical soldering iron.

A further object of the invention is the provision of an electrical soldering iron having a thermocouple element of sturdy construction for use with a remote control device for varying the heating current supplied to the soldering iron to maintain the tip of the soldering iron at a substantially uniform temperature during the operation thereof.

In accordance with one embodiment of the invention there is provided a rod-like thermocouple unit comprising a tube of one metal and a rod of another metal mounted in telescoping and spaced relation to each other and welded together at one end to form a hot juncture which is inserted in a recess in the soldering iron tip and bonded thereto and the opposite end of the thermocouple unit is mounted within a handle. A heating coil encircling one end portion of the thermocouple unit is mounted in the recess in the tip for heating the tip and is connected to a power circuit of a remote control device. The thermocouple unit is connected to a control circuit of the control unit and cooperates therewith to control the power supplied to the heating coil to maintain the tip of the soldering iron at a substantially uniform temperature. In one embodiment of the invention the heating coil is built as a unitary structure with the thermocouple unit and in other embodiments the heating coil is made as separate units independent of the thermocouple unit.

Other features and advantages of the invention will become apparent by reference to the following detailed description thereof and the accompanying drawings illustrating two embodiments of the invention, in which Fig. 1 is an elevational view of the soldering iron;

Fig. 2 is an enlarged longitudinal sectional view through a portion of the soldering iron taken on the line 2—2 of Fig. 1;

Fig. 3 is a longitudinal sectional view through a portion of the soldering iron taken on the line 3—3 of Fig. 1;

Fig. 4 is an elevational view of a modified form of the soldering iron;

Fig. 5 is an enlarged fragmentary longitudinal sectional view taken on the line 5—5 of Fig. 4;

Fig. 6 is an enlarged fragmentary longitudinal sectional view taken on the line 6—6 of Fig. 4; and Figs. 7 and 8 are enlarged fragmentary longitudinal sectional views showing another embodiment of the invention.

Referring to Figs. 1, 2, and 3 of the drawings wherein one embodiment of the invention is illustrated, the soldering iron comprises an elongated bit or tip 15 having a forwardly tapered end forming a pair of converging working or soldering surfaces 18 at the forward end thereof. The tip 15 is provided with a recess 20 for receiving the forward end of an elongated cylindrical unit 22 comprising a heating coil 24 and a thermocouple unit 26. The thermocouple 26 comprises a rod or wire 28 of one metal such as an alloy of nickel and copper and a tube 29 of another metal, as for example, iron, disposed in telescoping and spaced relation to each other. A sleeve 30 of iron, bonded to the forward end of the tube 29 and forming a part thereof is bonded to the end of the rod 28 to form the hot junction of the thermocouple. A thin sleeve of ceramic material 32 is mounted on the rod 28 within the tube 29 and serves to maintain the rod 28 and the tube 29 in spaced and insulated relation. The thickness of the wall of the ceramic sleeve 32 is less than the space between the rod 28 and the tube 29 to permit free relative movement of the rod 28 and tube 29 as the soldering iron is alternately heated and cooled. A sleeve 34 of rubber or other plastic insulating material is mounted on the rod 28 in spaced relation to the heating element and in gripping relation with the rod 28 to prevent the longitudinal displacement of the ceramic sleeve.

The heating coil 24 in the form of a helix is supported on the forward end portion of the tube 29 and in spaced and insulated relation thereto by a layer or tube 36 of electrical insulating material. One end of the coil 24 is connected to an annular member or collar 37 which is bonded to the end of the tube 29 and serves to electrically connect one end of the coil to the tube 29. The other end of the heating coil 24 is connected to a metal sleeve or tube 38 supported in telescoping and spaced relation to the thermocouple unit 26 by the layer 36 of insulating material. A layer of heat conducting powdered insulating material 40 such as powdered magnesium oxide encloses the heating coil 24 and the conductor sleeve 38 and is enclosed by a metal tube 42, which, at its forward end, is directed inwardly into engagement with the collar member 37 and is bonded thereto.

At the rear end of the unit 22 the rod or central conductor 28 of the thermocouple unit extends beyond the tubular element 29 thereof, the tubular element 29 extends axially beyond the end of the tubular conductor 38, which in turn extends axially beyond the end of the outer tubular casing 42. A bushing 44 of electrical insulating material is pressed onto the end of the tube 42 and is adapted to slidingly engage in a bore 45 of a handle member 46. A terminal member or block 48 of electrical insulating material removably supported in the bore 45 of the handle has mounted therein terminals 50, 51, and 52 adapted to contact the conductors 28, 29, and 38, respectively, as shown in Fig. 3. The terminals 50 and 51, which are electrically connected to the cold junction end of the thermocouple 26, are connected by conductors 55 and 56 to a control circuit of a remote control device 58. The terminals 52 and 51, which are electrically connected to the ends of the heating coil 24, are connected by conductors 59 and 60 to a power circuit of the remote control device 58 which is connected through conductors 61 to a power line or other source of electric current.

The forward end of the unit 22 is bonded to the tip 15 in the conforming recess therein and when current is supplied to the heating coil 24, the heat generated thereby is readily transferred to the tip 15. In response to the heating of the tip a current is generated in the thermocouple which current is utilized in cooperation with the control circuit of the remote control device to control the current supplied to the heating coil so as to maintain the tip at a predetermined substantially uniform temperature.

The tube 42 which forms a casing for the unit 22 is compressed radially inwardly to compress some of the components of the unit against the thermocouple tube 29 to secure the components in assembled relation and to compact the powdered magnesium oxide between the heating coil 24 and the tube 42. The thermocouple tube is sufficiently heavy and sturdy to withstand the pressure of the compressing forces and to provide a bore therein of a size to freely receive the sleeves 32 and 34 therein with sufficient clearance to permit free axial movement of the conductors 28 and 29 relative to each other during the heating and cooling cycles of the soldering iron tip and parts associated therewith.

The embodiment illusrated in Figs. 4, 5, and 6, comprises a metal soldering iron tip 70 provided with a tapered forward end having converging work or soldering surfaces 71—71 at the forward end thereof and has a central axial cylindrical recess or bore 72 for receiving the forward end portion of a thermocouple unit 75. The thermocouple 75 is similar to the thermocouple 26 and comprises a central conductor 76 in the form of a wire rod of one metal such as constantan and a tubular conductor 78 formed of another metal such as iron, which conductors are mounted in telescoping and spaced relation to each other. The inner end of the tubular conductor 78 is bonded to a sleeve 80 of iron, which in turn is bonded to the end of the conductor 76 to form the hot juncture of the thermocouple. A spacer sleeve 82 of ceramic or other insulating material is interposed between the conductors 76 and 78 and is retained in place by a sleeve of rubber or other plastic insulating material 83. The forward end of the rod-like thermocouple unit 75 conforms to and engages the walls of the recess 72 of the tip and is bonded thereto as by brazing.

A heating unit 84 is positioned in a counterbore 85 in the tip 70 in telescoping relation to the thermocouple unit 75. The heating unit 84 comprises a heating element 86 which is formed from a high resistance metal wire which is bent intermediate its ends to form a loop with the wires spaced parallel to each other and is then wound into a helix with the ends thereof extending from one end of the helix. The helical heating element 86 is encased in a metal conductor 87 and is spaced from the inner and outer cylindrical walls 88 and 89, respectively, thereof by suitable insulation 90 such as powdered magnesium oxide. In forming the heating unit 84 the helix 86 with the powdered magnesium insulation 90 therearound is positioned between the metal sleeves 88 and 89 in telescoped and assembled relation and the parts thus assembled are placed in a die and compressed together radially to predetermined dimensions and the ends of the sleeves 88 and 89 are flanged transversely to form end walls of the unit 84. Apertures formed in one of the end walls permit the ends of the heating element 86 to pass therethrough. The heating unit thus forms a replaceable cartridge 84 which may be brazed onto the thermocouple unit 75 in a predetermined spaced relation to the end thereof and the thermocouple unit 75 and the heating unit 84 thereon may be inserted into the bore and counterbore 72 and 85, respectively, and brazed to the tip.

Conductor leads 91 are welded to the ends of the heating element 86 and are encased in suitable insulating sheaths 92 and extend axially parallel to the thermocouple 75. At the other end of the thermocouple unit 75 a bushing 95 of electrical insulating material is fixed to the thermocouple unit 75 adjacent the other end thereof, which bushing is adapted to engage slidably in the bore 96 in a handle member 97. The outer metal tube 78 of the thermocouple 75 forms a suitable connecting member between the handle 97 and the tip and is sufficiently sturdy to support the tip and the heating element thereon.

A terminal supporting member 100 of insulating material removably mounted within the handle 97 supports a plurality of terminals 101, 102, 103, and 104. The terminal 101 is slidably engageable with the end of the conductor element 76 which projects beyond the end of the tubular conductor 78 which extends rearwardly of the bushing 95 and is adapted to be slidably engaged by the terminal 102. The terminals 103 and 104 are adapted to engage the ends of the conductors 90—90 of the heating coil and the conductors 90 pass through slots 107—107 in the supporting bushing 95. The terminals 101 and 102 which are connetced to the cold junction end of the thermocouple are connected by conductors 109 and 110 to a control circuit of a remote control unit 112 and the terminals 103 and 104 in series with the heating coil 86 are connected by conductors 113 and 114 to a power circuit of the remote control unit 112 which is connected through leads 115 to a suitable source of electric current. If desired a tubular protective member 116 of insulating material may be telescoped over the conductors 90 and the portion of the thermocouple unit 75 between the tip 70 and the handle 97 to protect the conductors 90.

A modified embodiment of a replaceable heating unit 120 (Figs. 7 and 8) comprises a heating coil 122 supported between and in spaced relation to a pair of metal sleeves 124 and 126 by suitable insulating material 128 such as powdered magnesium oxide. The heating coil 122 which is in the form of a helix has one end 129 thereof electrically connected to the metal sleeves 124 and 126. As shown herein the end 129 is gripped between a pair of annular metal bands 130 which are secured to the end portions of the sleeves 124 and 126. The end portions of the sleeves 124 and 126 are flanged transversely around the strips 130 to form a closure or end wall for the heating unit. One or both of the sleeves 124 and 126 may extend beyond the other end of the heating coil 122. As shown herein the inner sleeve 126 terminates a short distance beyond the end of the coil 122 and has an end portion thereof bent transversely to form an end wall 134 for preventing the displacement of the powdered insulating material 128. The outer metal sleeve 124 which may serve as an electrical conductor to one end of the heating coil 122 extends beyond the heating coil 122 as shown in Figs. 7 and 8 and is adapted to fit into the bore of a bushing 136 which is slidably mounted in a bore 138 of a handle member 139. The other end of the heating coil 122 extends through an aperture in the end wall 134 of the inner sleeve and has welded thereto a conductor 142 which is enclosed in an insulating sheath 143.

The heating element 120 surrounds a thermocouple unit 141 which is identical to the thermocouple unit 75 (Figs. 5 and 6) and fits into a counterbore 142 in the tip 143 and is bonded thereto as by brazing. The tubular and rod-like conductors 145 and 146 of dissimilar metals of the thermocouple are bonded together at their forward end to form a hot junction which is disposed in a bore 147 of the tip 143 and bonded thereto. Terminal connectors 150, 151, 152, and 153 mounted in a supporting bushing 154 removably mounted in the bore of the handle 139 engage the conductors 124, 145, 146, and 142, respectively, of the heating and the thermocouple units. The terminal connectors 151 and 152 are connectible by conductors 155 to a remote control circuit of a remote control device (not shown) for establishing electrical connections between the thermocouple and the control circuit. The terminal conductors 150 and 153 are connectible by conductors 157 to a power circuit of the remote control device and serve to establish electrical connections between the heating coil 122 and the power circuit. Since the heating coil 122 is electrically connected through members 130 and 126 through the conductor 145, which serves as a common conductor to the thermocouple junction and the heating coil, the terminal connector 154 may be omitted and the conductor 157 may be connected to the terminal 151, if desired. In the embodiment shown in Figs. 7 and 8 the heating unit 120 and the thermocouple unit 141 may be applied to the tip individually or together, and the outer sleeve 124, which serves to enclose and protect the conductor 142, also aids in the assembling of the heating unit 120 to the tip 143.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a soldering iron, the combination of a tip having a recess therein, a rod-like thermocouple element having an end portion extending into the recess in said tip and bonded thereto comprising a tube of one metal and a rod of another metal arranged in telescoping and spaced relation to each other and bonded together at one end thereof to form a hot junction in said tip, an electrical heating element positioned externally of said thermocouple and in the recess in said tip, and handle means on said thermocouple element for supporting said tip.

2. In a soldering iron, the combination of a tip having a recess therein, a handle member, a rigid elongated thermocouple unit having one end portion extending into said recess in said tip and bonded thereto and the other end portion extending into and removably secured to the handle member and serving as a connector member between the handle and the tip, said thermocouple unit comprising a pair of metal conductor members of dissimilar metal arranged in spaced, parallel and insulated relation to each other and bonded together at one end thereof to form a hot junction in said tip, an electrical heating coil encircling said thermocouple unit and disposed within the recess in said tip, and conductor means connected to said heating coil extending into said handle.

3. In a soldering iron, the combination of a tip having a recess therein, a handle member, an elongated thermocouple unit having one end portion extending into said recess in said tip and bonded thereto and the other end portion extending into and removably secured to the handle member and serving as a connector member between the handle and the tip, said thermocouple unit comprising a rod of one metal and a tube of dissimilar metal arranged in telescoping, spaced, and insulated relation to each other and bonded together at one end thereof to form a hot junction in said tip, an electrical heating coil encircling said thermocouple unit and disposed within the recess in said tip in insulated relation thereto, conductor means connected to said heating coil extending into said handle, connector means in said handle engaging said thermocouple and connectible with a control circuit of a remote control device for establishing electrical connections between said thermocouple and said control circuit, and connector means in said handle engaging said conductor means and connectible with a power circuit in said remote control device for establishing electrical connections between said heating coil and said power circuit.

4. In a soldering iron, the combination of a tip having a recess therein, a rigid thermocouple unit having an end portion extending into said recess in said tip and bonded thereto comprising a pair of elongated conductor members of dissimilar metal arranged in spaced, parallel and insulated relation to each other and bonded together at one end thereof to form a hot junction in said tip, an electrical heating coil encircling said thermocouple unit and disposed within the recess in said tip, a handle mounted on the other end of said thermocouple unit, conductor means connected to said heating coil extending into said handle, said rigid thermocouple unit serving as a connector member between said handle and said tip, connector means in said handle engageable with the conductors of said thermocouple unit and connectible to a control circuit of a remote control unit for establishing electrical connections between the thermocouple and said control circuit, and connector means in said handle engageable with said conductor means from said heating coil and connectible to a power circuit of said remote control unit for establishing electrical connections between said heating coil and said power circuit.

5. In a soldering iron, the combination of a thermocouple unit having a rod of one metal and a tube of a dissimilar metal disposed in spaced and telescoping relation to each other and with one end of the rod bonded to one end of the tube to form a hot junction, a heating coil encircling said thermocouple unit in spaced relation thereto, a metal tubular casing encircling said heating coil and said thermocouple, insulating means supporting said heating coil in spaced and fixed relation to said casing and said thermocouple unit, a metal soldering tip having a recess therein for receiving said heating coil, one end of said casing, and the hot-junction end portion of said thermocouple unit therein, said one end of the sleeve and the hot junction of said thermocouple unit being bonded in engagement with said tip, a handle on the other end of said casing, conductor means extending from said heating coil into said handle, connector means in said handle electrically connected to said conductor means and connectible to a power circuit of a remote control device for heating said tip, and connector means in said handle electrically connected to said thermocple unit and connectible to a remote control circuit of said remote control device for varying the power to said heating coil to maintain said tip at a relatively uniform temperature.

6. In a soldering iron, the combination of a rigid thermocouple unit having a central wire of one metal and a tube of a dissimilar metal disposed in spaced and telescoping relation to each other and with one end of the wire bonded to one end of the tube to form a hot junction, a heating coil encircling said thermocouple unit in spaced relation thereto and having one end electrically connected to said tube, a metal tubular casing encircling said heating coil and said thermocouple to form a supporting unit, insulating means supporting said coil in spaced and fixed relation to said casing and said thermocouple unit, a metal soldering tip having a recess for receiving said heating coil, one end of said casing, and the end portion of said thermocouple unit therein, said one end of the sleeve and the hot junction of said thermocouple unit being bonded in engagement with said tip, a handle on the other end of said casing, a conductor extending from the other end of said heating coil into said handle, connector means in said handle engageable with said conductor and said tube and connectible to a power circuit of a remote control device for establishing electrical connections between said heating coil and said power circuit, and connector means in said handle engageable with said thermocouple unit and connectible to a remote control circuit of said remote control device for establishing electrical connections between said heating coil and said power circuit.

7. In a soldering iron, the combination of a metal tip having a bore therein, a handle, a thermocouple unit having a rod of one metal and a tube of a dissimilar metal disposed in spaced and telescoping relation to each other and with one end of the rod bonded to one end of the tube to form a hot junction, insulating means for maintaining said wire and tube in spaced relation to each other, the hot junction of said thermocouple unit extending into the bore of said tip and the other end extending into said handle, a heating coil within the bore of said tip encircling a portion of said thermocouple unit in spaced relation thereto and having one end thereof electrically connected to said tube, a tubular conductor encircling said thermocouple tube in spaced relation thereto electrically connected to the other end of said coil and extending therefrom into said handle, a metal tubular casing encircling said heating coil and said tubular conductor and having one end thereof fitting into the bore of said tip and the other end thereof extending into said handle and supported thereby, insulating means supporting said heating coil and said tubular conductor in spaced relation to said casing and to said thermocouple unit, and means uniting the end of the casing with the hot junction end of said thermocouple, the end of said thermocouple and said casing conforming to the bore in said tip and being bonded thereto.

8. In a soldering iron, the combination of a metal tip having a bore therein, a handle, a thermocouple unit having a rod of one metal and a tube of a dissimilar metal disposed in spaced and telescoping relation to each other and with one end of the rod bonded to one end of the tube to form a hot junction, insulating means for maintaining said rod and tube in spaced relation to each other, the hot junction of said thermocouple unit extending into the bore of said tip and bonded thereto and the other end thereof extending into said handle, a heating coil within the bore of said tip encircling a portion of said thermocouple unit in spaced relation thereto and having one end thereof electrically connected to said thermocouple tube, a tubular conductor encircling said thermocouple tube in spaced relation thereto and electrically connected to the other end of said coil and extending therefrom into said handle, a metal tubular casing encircling said heating coil and said tubular conductor and having one end thereof fitting into the bore of said tip and bonded thereto and the other end thereof extending into said handle and supported thereby, and insulating means supporting said heating coil and said tubular conductor in spaced and fixed relation to said casing and to said thermocouple unit, connector means in said handle engaging said tubular conductor and said thermocouple tube and connectible to a power circuit of a remote control device for establishing electrical connections between said heating coil and said power circuit, and connector means in said handle engaging said thermocouple unit and connectible to a control circuit of said remote control device for establishing electrical connections between said thermocouple unit and said control circuit.

9. In a soldering iron, the combination of a tip having a bore and a counterbore therein, an elongated rigid thermocouple unit having an end portion extending into said bore and bonded to said tip, said thermocouple unit comprising a tube of one metal and a rod of another metal arranged in telescoping and spaced relation to each other and bonded together at one end thereof to form a hot junction in said tip, insulating means for maintaining said tube and said rod in spaced relation to each other, a handle mounted on the other end of said thermocouple unit, a hollow cylindrical heating unit comprising a metal casing having inner and outer cylindrical walls arranged in spaced and co-axial relation to each other, a heating coil in said casing, electrical insulating means supporting said heating coil in spaced relation to the walls of said casing, said heating unit encircling a portion of said thermocouple unit and having a portion thereof including the heating coil disposed within the bore of said tip, one cylindrical wall of said heating unit extending from said tip into said handle, and conductor means extending from said heating coil into said handle.

10. In a soldering iron, the combination of a tip having a bore and a counterbore therein, a rigid thermocouple unit having an end portion extending into said bore and bonded thereto comprising a tube of one metal and a wire of another metal arranged in telescoping and spaced relation to each other and bonded together at one end thereof to form a hot junction in said tip, a hollow cylindrical heating unit comprising a metal casing having inner and outer cylindrical walls arranged in spaced and co-axial relation to each other, a helical heating coil in said casing, electrical insulating means supporting said heating coil in spaced relation to the walls of said casing, said heating unit encircling said thermocouple unit and being disposed in the counterbore of said tip and bonded thereto, a handle removably connected to one end of said thermocouple unit for supporting said tip, and conductor means extending from said heating coil to said unit.

11. In a soldering iron, the combination of a tip having a bore and counterbore therein, a rigid thermocouple unit having an end portion extending into said bore and bonded thereto comprising a tube of one metal and a rod of another metal arranged in telescoping and spaced relation to each other and bonded together at one end thereof to form a hot junction in said tip, a hollow cylindrical heating unit comprising a metal casing having inner and outer cylindrical walls arranged in spaced and co-axial relation to each other, a heating coil in said casing, electrical insulating means supporting said heating coil in spaced relation to the walls of said casing, said heating unit being disposed in the counterbore in said tip in telescoping relation to said thermocouple unit and bonded to said tip, and conductor leads from said heating coil.

12. In a soldering iron, the combination of a tip having a bore and a counterbore therein, an elongated rigid thermocouple unit having an end portion extending to said bore and bonded thereto comprising a tube of one metal and a rod of another metal arranged in telescoping and spaced relation together and bonded together at one end thereof to form a hot junction in said tip, a handle mounted on the other end of said thermocouple unit, a hollow cylindrical heating unit comprising a metal casing having inner and outer cylindrical walls arranged in spaced and co-axial relation to each other, a helical heating coil in said casing having one end thereof electrically connected to said casing, electrical insulating means supporting said heating coil in spaced relation to the walls of said casing, said heating unit and the heating coil thereof being disposed around the thermocouple unit and in the counterbore in said tip and the outer sleeve of said heating unit being bonded at one end to said tip and extending therefrom into said handle, and a conductor extending within said outer sleeve from the other end of said heating coil into said handle.

13. In a soldering iron, the combination of a tip having a bore and a counterbore therein, a handle member, an elongated rigid thermocouple unit having one end portion extending to said bore and bonded thereto and the other end portion extending into said handle member, said thermocouple unit comprising a pair of rigid elongated conductors of dissimilar metals arranged in spaced relation to each other and bonded together at one end thereof to form a hot junction in said tip, a hollow cylindrical heating unit comprising a metal casing having inner and outer cylindrical walls arranged in spaced and co-axial relation to each other, a helical heating coil in said casing, electrical insulating means supporting said heating coil in spaced relation to the walls of said casing, said heating unit and the heating coil thereof being disposed around the thermocouple unit and in the counterbore in said tip and the outer sleeve of said heating unit being bonded at one end to said tip and extending therefrom into said handle, and conductor means extending from said heating coil into said handle.

14. In a soldering iron, the combination of a tip having a bore and a counterbore therein, a handle member, an elongated rigid thermocouple unit having one end portion extending to said bore and bonded thereto and the other end portion extending into said handle member, said thermocouple unit comprising a tube of one metal and a rod of another metal arranged in telescoping and spaced relation together and bonded together at one end thereof to form a hot junction in said tip, a hollow cylindrical heating unit comprising a metal casing having inner and outer cylindrical walls arranged in spaced and co-axial relation to each other, a helical heating coil in said casing, electrical insulating means supporting said heating coil in spaced relation to the walls of said casing, said heating unit and the heating coil thereof being disposed around the thermocouple unit and in the counterbore in said tip and the outer sleeve of said heating unit being bonded at one end to said tip and extending therefrom into said handle, conductor means extending from said heating coil into said handle, and connector means in said handle connectible individually to a power circuit and a control circuit of a remote control device for establishing electrical connections between the conductor means from said heating coil and said power circuit and between said thermocouple unit and said control circuit.

15. In a soldering iron, the combination of a tip having a bore and a counterbore therein, a rigid thermocouple unit having an end portion extending into said bore and bonded thereto comprising a tube of one metal and a rod of another metal arranged in telescoping and spaced relation together and bonded together at one end thereof to form a hot junction in said tip, a handle mounted on the other end of said thermocouple unit, a hollow cylindrical heating unit comprising a metal casing having inner and outer cylindrical walls arranged in spaced and co-axial relation to each other, a helical heating coil in said casing having one end thereof electrically connected to said casing, electrical insulating means supporting said heating coil in spaced relation to the walls of said casing, said heating unit and the heating coil thereof being disposed around the thermocouple unit and in the counterbore in said tip and the outer wall of said heating unit being bonded at one end to said tip and extending therefrom into said handle and serving as a first conductor from said coil, and a second conductor from said coil extending within said outer wall into said handle, connector means in said handle engageable with said thermocouple unit and connectible to a control circuit of a remote control unit for establishing electrical connections between said control unit and said thermocouple unit, and connector means in said handle engageable with said first and said second conductors from said coil and connectible to a power circuit of said remote control unit for establishing electrical connections between said power circuit and said heating coil.

16. In a soldering iron, the combination of a tip having a recess therein, a rigid elongated thermocouple unit having an end portion extending into the recess in said tip and bonded thereto comprising a pair of conductor members of dissimilar metal arranged in insulated relation to each other and bonded together at one end thereof to form a hot junction in said tip, an electrical heating element positioned externally of said thermocouple and in the recess in said tip, and handle means on said thermocouple element for supporting said tip.

References Cited in the file of this patent

FOREIGN PATENTS

| | | |
|---|---|---|
| 588,216 | Great Britain | May 16, 1947 |
| 930,351 | France | Aug. 4, 1947 |